United States Patent [19]

Omelis et al.

[11] Patent Number: 5,098,975
[45] Date of Patent: Mar. 24, 1992

[54] ANISOTROPIC LIQUID CRYSTALLINE POLYMER FILMS

[75] Inventors: Jurgen Omelis, Darmstadt; Stefan Endisch, Riedstadt/Crumstadt, both of Fed. Rep. of Germany

[73] Assignee: Rohm GmbH Chemische Fabrik, Darmstadt, Fed. Rep. of Germany

[21] Appl. No.: 557,655

[22] Filed: Jul. 25, 1990

[30] Foreign Application Priority Data

Jul. 25, 1989 [DE] Fed. Rep. of Germany ....... 3924554

[51] Int. Cl.$^5$ ............... C08F 26/02; C08F 118/02
[52] U.S. Cl. .................... 526/312; 526/303.1; 526/310; 526/319; 526/326; 526/328; 526/328.5; 252/299.01; 359/103
[58] Field of Search ............ 526/310, 320, 323.1, 526/312; 528/194

[56] References Cited

U.S. PATENT DOCUMENTS

| | | | |
|---|---|---|---|
| 4,293,435 | 10/1981 | Portugall | 252/299.01 |
| 4,514,553 | 4/1985 | Conciatori | 526/323.1 |
| 4,617,371 | 10/1986 | Blumstein | 528/194 |
| 4,654,412 | 3/1987 | Calundann | 528/176 |
| 4,710,547 | 12/1987 | Uryu | 525/437 |
| 4,822,865 | 4/1989 | DeMartino | 526/292.2 |
| 4,865,430 | 9/1989 | DeMartino | 350/376 |
| 4,944,896 | 7/1990 | DeMartino | 252/587 |

Primary Examiner—Joseph L. Schofer
Assistant Examiner—Fred Zitomer
Attorney, Agent, or Firm—Oblon, Spivak, McClelland, Maier & Neustadt

[57] ABSTRACT

An anisotropic liquid crystalline polymer film comprised of a photocrosslinked liquid crystalline poly(meth)acrylate ester.

6 Claims, 2 Drawing Sheets

ANISOTROPIC LIQUID CRYSTALLINE POLYMER FILMS

BACKGROUND OF THE INVENTION

1. Field of the Invention

The present invention relates to a method of producing liquid crystalline polymer films, particularly such as are self-supporting and anisotropic, which films are based on photocrosslinked liquid crystalline poly(meth)acrylates. These films can be used for the storage of optical data.

2. Description of the Background

Liquid crystalline polymers have been receiving great attention, particularly in the area of information storage. (See Allen, G., and Bevington, J., 1989, "Comprehensive Polymer Science", Vol. 5, pub. Pergamon Press, pp. 701-732.)

Various methods are known for orienting anisotropic thin liquid crystalline polymer films so that the films can be converted into liquid crystalline monodomains. The means of bringing about the orientation include, e.g.:

Electromagnetic fields (see Eur. OSs 0 231, 856; 0, 231, 857; and 0, 231, 858);

Surface effects (Ger. Pat. Appl P 38 25 066); and

Mechanical deformation (see Finkelmann, H., and Hammerschmidt, K., *Makromol. Chem.*, 190, 1089-1101, 1989).

Macroscopic orientation takes place generally in a temperature range between the glass temperature (Tg) and the clearing temperature (Tn,i) of the polymer. In the case of liquid crystalline side chain polymers, the temperature is close to the clearing temperature.

Experience with the electromagnetic field and surface effect methods shows that for liquid crystalline polymer films one is always confined to a structured support material and to specified layer thicknesses. Thus, according to Ger. Pat. App. P 38 25 066 layers 1-2 micron thick can be oriented without problems. However, these methods come up against their limits when the layer is in the range of 10-20 microns thick. In the past, such layers have been prepared by display technology, which unfortunately involves stringent thermal stressing of the polymers. The mechanical deformation method (shearing, stretching, or compressing) is used for orientation of liquid crystalline main chain polymers and crosslinked liquid crystalline polymers (see Zentel, R., Finkelmann, H., et al., "Adv. Polym. Sci.", 60/61; M. Gordon, (Ed.), pub. Springer-Verlag, Heidelberg, pp. 155-162; Zentel, R., et al., 1987 *Makromol. Chem.*, 188, 665-674; and Finkelmann, H., et al., 1987, *Mol. Cryst. Liq. Cryst.*, 142, 85-100.)

The orientation of liquid crystalline elastomers is carried out analogously to that of linear side chain polymers below T=Tn,i (transition from the nematic to the isotropic phase) in the rubber-elastic state, and is frozen-in below the glass temperature. Liquid crystalline elastomers have a number of disadvantages. For example, crosslinked polysiloxanes have very low Tg (<room temperature (RT)), so that the orientation only survives when stress is applied or at low temperatures (below Tg).

In the case of known crosslinked liquid crystalline poly(meth)acrylates produced by chemical crosslinking, Tg>RT but film preparation is costly, and the prepared films are inadequately homogeneous. Thus there remains a need for devising suitable crosslinkable liquid crystalline polymers which can be converted to a macroscopically oriented anisotropic state by mechanical deformation over a practicably wide range of layer thicknesses, e.g. 5-50 micron, without the use of a support material.

SUMMARY OF THE INVENTION

Accordingly one object of the present invention is to provide an anisotropic liquid crystalline polymer film.

Another object of the present invention is to provide a method of producing anisotropic liquid crystalline polymer films, particularly self-supporting films.

Still another object of the present invention is to provide polymer films which are useful in optical data processing.

Briefly, these objects and other objects of the present invention as hereinafter will become more readily apparent can be attained by an anisotropic liquid crystalline polymer film formed from a photocrosslinked liquid crystalline poly(meth)acrylate ester PP.

DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Photocrosslinked Liquid Crystalline Poly(meth)acrylates (PP)

A precondition for the photocrosslinking of the polymer P'P' of the invention is that photocrosslinkable groups must be present in the organic-soluble polymer P'P', which groups represent at least part of the monomers used. Photocrosslinkable groups ordinarily respond to light radiation in the wavelength range 250-450 nm. (For references on the technology of photocrosslinking in polymers see Allen, S. G. and Bevington, J. C., 1989, "Comprehensive Polymer Science", Vol. 6, pub. Pergamon Press, pp. 135-148; Mark, H. F., et al., 1982, "Kirk-Othmer Encyclopedia of Chemical Technology", 3rd Ed., Vol. 17, pub. J. Wiley & Sons, p. 680; and Rabeck, J. F., 1987, "Mechanism of Photophysical Processes and Photochemical Reactions in Polymers", pub. J. Wiley & Sons, pp. 406-444.) Particularly suitable for the purposes of the present invention are such monomers which contain photocrosslinkable units as mesogenous groups. Candidates for such photocrosslinkable groups include, in general, chromophoric groups which form light-induced covalent chemical bonds between themselves, whereby crosslinking develops by intermolecular reaction. At the same time, the groups must be suitable as components of liquid crystalline polymers. In principle, groups suitable for photodimerization are the simplest examples. Examples which might be mentioned are the stilbene group, the cinnamic acid group, and the chalcone group. Possible monomers for the introduction of these groups include, e.g., those of formula I:

I where
R represents hydrogen or methyl;
X represents a —COO— group or where
R₁ is hydrogen or an alkyl group with 1-4 carbon atoms;
Ar represents a —Q—CM=CH—Q' group, where Q is a double-bond-activating group with a multiple bond character, preferably chosen from the group of and where r, p, m, and q independently represent zero or 1, and where Q' is hydrogen or a possibly substituted phenyl, naphthyl, or furanyl group, or a pyridinium ion; or is where $R_2$ is a phenyl group or a hydroxy group, or an alkoxy group with 1-6 carbon atoms, and i is zero or 1, where M is hydrogen or —C≡N; and n represents zero or an integer from 1 to 14, preferably from 2 to 14. Alternatively, Ar represents the group:

where s is zero or 1.

As a rule, the content of the monomers containing the photocrosslinkable groups, as a percentage by weight of the poly(meth)acrylates, is in the range 0.1-20 wt. %, preferably between 1 and 10 wt. %. The total composition should be chosen such that the liquid crystalline character and the desired properties of the polymer PP, which properties determine its applicability, are ensured.

Soluble copolymers are produced, of suitable composition, by copolymerization, advantageously in the molecular weight range $10^4$-$10^6$ g/mol, preferably >$10^5$ g/mol.

The other monomers can be selected from among the known monomers with mesogenous groups. In general, monomers of formula II are suitable:

II where
X and R have the same meanings as above, and
Y represents a spacer unit, preferably comprised of a flexible chain with 1-14, preferably 2-12 chain members, particularly an alkylene group —(CH₂)ₙ—, wherein n is 1 to 14, preferably 2 to 12, wherewith possibly individual chain members may be substituted, e.g. with alkyl groups having 1-4 carbon atoms or with halogen such as fluorine or chlorine, or wherein individual chain members are replaced by an ether bridge, or Y is a phenyl group; and
Z represents a mesogenous group.

The production of the monomers of types I and II is per se known, and can be carried out by techniques which are per se known or which are similar to known techniques (see Ger. OS 36 23 395).

A description of suitable mesogenous groups can be found in Kelker and Hatz, 1989, "Handbook of Liquid Crystals", pub. Verlag Chemie, pp. 67-113.

Typically, the units X-Y connect to a mesogenous group Z which may contain, e.g., aromatic groups, and which group Z may be represented by the formula III:

III wherein L represents a bridge comprised of a group —N=N—; —COO—; —OOC—; —N=C(H)—; —C(H)=N—; —CH=CH—; or a group v represents zero or 1; and
R' represents a group or, if v=0, then R' may represent wherewith L' and v' have the same meanings as L and v, and
R$_3$ represents hydrogen, (O)$_{s'}$—(CH$_2$)$_t$—H, —CN, or halogen, particularly fluorine, chlorine, or bromine, where t is a number from 1 to 8, particularly 1 to 6, and
s' is zero or 1.

Of particular interest are those polymers comprised of monomers of formula II where Z represents the following mesogenous groups:

In a particularly preferred embodiment of the invention, Z represents a chromophoric structural element, i.e. a dye F (see the next paragraph). The proportion of the monomer units containing the dye F in the polymer can be 0–99 wt. % of the total of the monomer units, preferably ≧50 wt. %, generally ≧10 wt. %, or at least 0.1 wt. %. The dye F is preferably characterized in that it changes its molecular geometry when acted on by the incident light; however it is not mandatory that the wavelength of the incident light, as a rule, that of a writing laser, coincide with the absorption maximum of the dye or dyes, because, e.g., photoisomerism may occur under radiation not in the region of the absorption maximum.

There are also certain other criteria which have been developed for dyes which are to be used in liquid crystalline systems (see Constant, J., et al., 1978, *J. Phys. D, Appl. Phys.*, II, 479 ff; Jones, F. and Reeve, T. J., *Mol. Cryst. Liq. Cryst.*, 60, 99 ff; and Eur. Pats. 43 904, 55 838, and 65 869). In particular, these dyes should not ionize in an electric field and should have high molecular extinction coefficients.

In general useful dyes F within the scope of the present invention should have absorption maxima in the wavelength range 300–1,000 nm.

Advantageously, the dye F has at least one structural element which alters its geometry under the specified light radiation action.

Such structural elements may contain, e.g., multiple bonds, particularly cis-trans-isomerizable bonds. Other isomerizable systems may be present, e.g. systems based on ring opening or proton transfer. As a rule, the dye F has a length of at least 10 Angstroms in its preferred direction. Suitable examples of bridging groups —A—, which enable geometric isomerism, include:

In particular, dyes F have a structure wherein such a group joins two aromatic rings or ring systems. Similarly, the dyes may comprise isomerizable derivatives of azobenzene, of azoxybenzene, of azomethines, and the like. Advantageously, the dyes F also contain substituents, which are per se known, which serve to govern the absorption characteristics of the individual dyes. (See 1956 "Ullmanns Encyklopaedie der techn. Chemie", 3rd Ed., Vol. 7, pp. 153–183, pub. Urban & Schwarzenberg; Griffiths, J., 1986 *Chem. in Britain*, 997–1000; and Hollas, C., 1979 *JSDC*, 285–294.) Some suitable candidate groups include, e.g., cyano groups or auxochromic groups, e.g. electron donor substituents such as amino (possibly alkylated), keto, hydroxy, or alkoxy groups, and electron acceptor groups such as nitro, nitroso, carbonyl, halogen, and the like. A particularly interesting class is that of azo dyes which also satisfy the abovementioned criteria.

Suitable azo dyes are described in, e.g., Ger. OSs 34 06 209 and 34 29 438; Eur. OS 65 869; Eich, M., et al., 1987, *Proc. SPIE-Int. Soc. Opt. Engg.*, 628 (*Mol. Polym. Optoelectron. Mater.: Fundam. Appl.*, 93–96). As a model for the inventively advantageously used dyes F, structures having the following formula IV are suggested, which structures are intended to be incorporated into the photocrosslinked liquid crystalline polymers PP:

—AS—A—AS'  IV where —A— has the same -meaning as above (bridge group), and preferably represents —N=N—; and wherewith the system may be comprised of per se known substituents with electron donor properties and those with electron acceptor properties; and where AS represents an aromatic system, preferably having 6 to 14 ring carbon atoms, particularly preferably being phenyl, which aromatic system is preferably joined to the spacer unit (Y in formula II) via an electron donor bridge group such as an ether group or an amino group, which amino group may be C$_1$-C$_4$ alkyl substituted, and also possibly via a second phenyl group which group is substituted, preferably by a branched substituent. AS and AS', as components of a low molecular weight dye F, may particularly bear known substituents from industrial dye chemistry such as C$_1$-C$_4$ alkyl, halogen, cyano, or polar groups such as, e.g., —COOH, —SO$_3$H, or —OH. AS' may be an aromatic system, preferably with

6-20 ring carbon atoms, preferably containing at least one substituted phenyl group.

Examples of possible substituents for the phenyl group in AS' are (i) at least one nitro group in the ortho or, preferably, para position to the connecting point of A, (ii) possibly at least one alkoxy group, preferably with 1-4 carbon atoms, (iii) possibly at least one halogen substituent, particularly chloro, in the ortho, meta, and/or para position; and (iv) an additional aromatic group AS", joined via a bridging group —A—, which bridging group may particularly be an azo group. The group AS" may be substituted from within the range of substituent possibilities mentioned above for AS'; or it may be (CN)$_2$C=CH—, (CN)$_2$C=C(CN)—, or —CF$_3$.

Suitable examples of possible structures of formula IV are:

-continued

Any of the above structural elements may function as a chromophoric structural element Z, for example, connected at the position provided for substitution.

In general the glass temperature Tg of the polymer comprised of monomers of groups I and II is greater than 40° C., preferably between 50° and 80° C. (For the determination of the glass temperature Tg, see Mark, H. F., et al., 1989, "Encyclopedia of Polymer Science and Engineering", 2nd Ed., Vol. 7, pub. J. Wiley & Sons, pp. 431,-544.)

The present polymers P'P', comprised of monomers of formulas I and II, can be processed from a concentrated solution into homogeneous films. In general the content of polymer P'P' in the solvent LM should be in the range 10-90 wt. %, preferably between 30 and 60 wt. %. Suitable solvents LM are relatively polar solvents or solvent mixtures, advantageously not having a boiling point which is very low yet being capable of being removed by simple means, particularly by evaporation. Particularly suitable are solvents which can also be used as the medium for the polymerization in solution. Particularly preferred solvents are oxygen- and halogen-containing solvents including ethers such as dioxane and tetrahydrofuran; ketones such as methyl isobutyl ketone, cyclopentanone, and cyclohexanone; halogenated hydrocarbons such as chloroform, dichloromethane, and trichloroethane; esters such as butyl acetate, ethylene glycol acetate, cyclic carbonates and lactones such as ethylene carbonate.

As a rule the boiling temperature should at least 40° C., under normal conditions.

Production of the Polymer P'P'

Polymer P'P' may be prepared by polymerization techniques known to the state of the art (see Rauch-Puntigamn, H., and Voelker, Th., 1967, "Acryl- und Methacrylverbindungen", pub. Springer-Verlag). Candidates for use as initiators are known initiators such as, in particular, azo compounds and peroxy compounds, particularly those which are soluble in organic solvents and are used in solution polymerization. The properties of the solvent, particularly the boiling point, should be consistent with the temperature dependence of the activity of the initiator (see Mark, F. H., 1989, "Encyclopedia of Polymer Science and Engineering", 2nd Ed., Vol. 15, pub. J. Wiley & Sons, pp. 402–418). Possible initiators include azobisisobutyronitrile, t-butyl peroctoate, benzoyl peroxide, and the like.

The concentration of the initiator is in the normal range, viz. c. 0.01.–2 wt. %, based on the monomers. Regulators, e.g. the customary sulfur regulators, may be added to the reaction mixture; however, regulators are usually not used in solution polymerizations.

The temperature of the polymerization depends on a number of factors, including the solvent used (e.g. if the process is carried out at reflux). In general the temperature is 20°–100° C., particularly 40°–80° C. The duration of the polymerization is generally 12–36 hrs.

The polymer P'P' may be processed from solution to form films, or may be precipitated out with an anti-solvent, possibly dried, and possibly redissolved prior to processing.

Production of Crosslinked Films from the Polymer P'P'

The films may be produced by techniques which are well known, e.g. by application to a support. A film may be applied by coating, dipping, spin-coating, or the like. The solvent is then removed, e.g. by evaporation under suitable conditions for processing the solvent. The film may then be dried further, e.g. in a drying cabinet. After the drying, the crosslinking is brought about by subjecting the film to radiation. The UV sources used may be those customarily used in carrying out UV-induced photoreactions, particularly photodimerizations, e.g. point sources or area sources with intensities $\geq 0.2$ mW/sq cm, and preferably in the wavelength range of 320–400 nm.

The application of UV radiation is advantageously carried out at temperatures above Tg and below $T_{n,i}$ of the polymer P'P', but the temperature may be as high as 10° C. above $T_{n,i}$. Temperatures 10°–20° C. below $T_{n,i}$ have proved particularly advantageous. The duration of radiation depends on the layer thicknesses, concentration of the crosslinking agent, and comonomer composition. As a rule the film is irradiated for 10 sec to 10 min. Then the polymer film which is formed is stretched, at ca. 5° C. below $T_{n,i}$. A tempering stage may be employed at 10°–20° C. below $T_{n,i}$, prior to the stretching. The duration of the tempering is, e.g., 5 min to 5 hr, depending on the thickness of the film and the degree of crosslinking. The degree of stretching (alpha = $l/l_o$) is between 50 and 300%, advantageously $>100\%$ After stretching, the sample is cooled slowly to room temperature, at 10° C./min. The degree of orientation achieved can be determined at room temperature by UV-VIS or IR spectroscopy.

There are a number of advantages to the polymer material of the present invention:
  (i) Films can be easily prepared from the polymer P'P'; and
  (ii) The liquid crystalline polymers can be oriented over a wide range of layer thicknesses, and without the use of a structured support material.

It has been found that after stretching, e.g. with a degree of stretching of 100% or more, the same degree of orientation as in a thin film can be achieved in a relatively thick film.

The present films are well suited for a number of uses, which include optical information storage, particularly for digital and holographic reversible data storage; the manufacture of optical components; and the like. In addition, the present polymeric material is suitable for use as storage material and/or top coating material for multilayer coatings, e.g. as thin layers on a substrate.

Having generally described this invention, a further understanding can be obtained by reference to certain specific examples which are provided herein for purposes of illustration only and are not intended to be limiting unless otherwise specified.

The following monomers are representative of their respective monomer classes for preparing polymers P'P':

Monomers of Formula I:

Monomer I-A

Monomers of Formula II:

Monomer II-A

Monomer II-B

Monomer II-C

Monomer II-D

EXAMPLE 1

A. Polymerization of the Liquid Crystalline Polymer P'P'-1

A 3.0 g (9 mmol) amount of monomer II-A, 187 mg (0.5 mmol) of monomer II-C, and 154 mg (0.5 mmol) of monomer I-A were dissolved in 4 ml dioxane (absolute), and 0.1 mol % 2,2'-azobis(2,4-dimethylvaleronitrile), based on the total amount of the monomers, was added. After degassing, the polymerization was carried out 12 hrs at 60° C. During this time, 0.1 mol of the abovementioned initiator was added 2 hours after polymerization and 0.1. mol dilauroyl peroxide was added 4 hrs. after polymerization initiation. Then precipitation was carried out in a 20-fold excess of methanol. After a second precipitation, the monomer-free polymer was dried 5 days in vacuum. The result was the liquid crystalline prepolymer P'P'-1, of the formula:

where a=95, b=5, and c=5, and a+b+c=100 mol %. The yield was 2.35 g, 70% of theoretical.

Characterization:
Mn=142,000 g/mol
Tg=45° C.
$T_{n,i}$=100° C.

B. Crosslinking of the Liquid Crystalline Polymer P'P'-1 to Form the Polymer PP-1

A 50% solution of polymer P'P'-1 in methylene chloride was filtered to remove dust and was applied to a hydrophobized glass support (50 micron Rakel). After the film was dried at room temperature, it was dried 1 day in vacuo. Several films were prepared with thicknesses between 15 and 35 micron, photocrosslinked at two different temperatures (for variant 1, $T>T_{n,i}$; for variant 2, $Tg<T<T_{n,i}$). The films were irradiated 2 min with a UV lamp (UV-P 200, with maximum wavelength 320-260 nm) at a distance of 7.5 cm.

For the crosslinked films:
$T_{n,i}$=97° C.,
Tg=50° C., and
Degree of swelling, $Q_v$=9.37, in $CH_2Cl_2$ at room temperature.

C. Orientation of Crosslinked Liquid Crystalline Polymer

Figure 1:
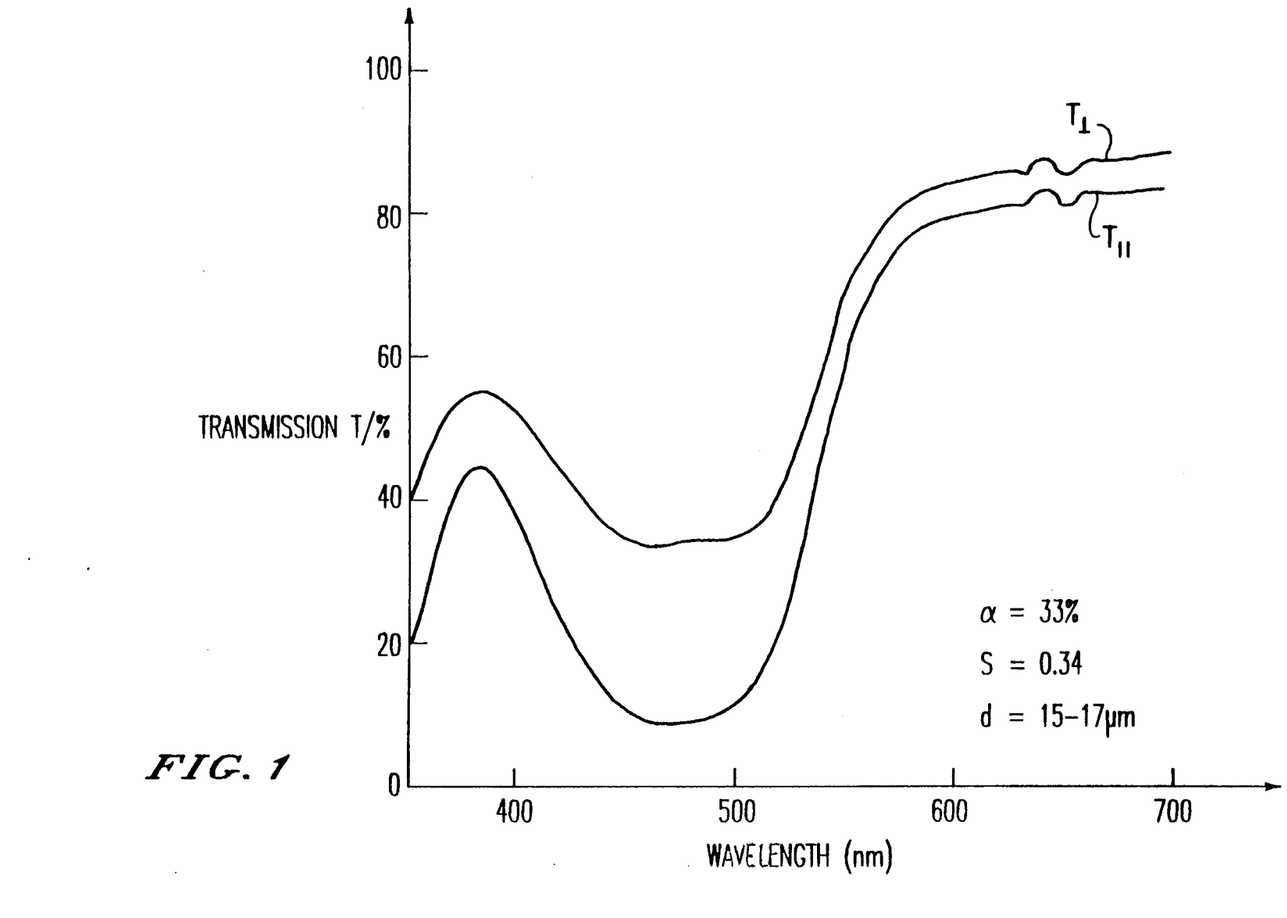
FIGS. 1 and 2 are the UV-VIS transmission spectra of stretched polymer films of Example 1.
Figure 2:
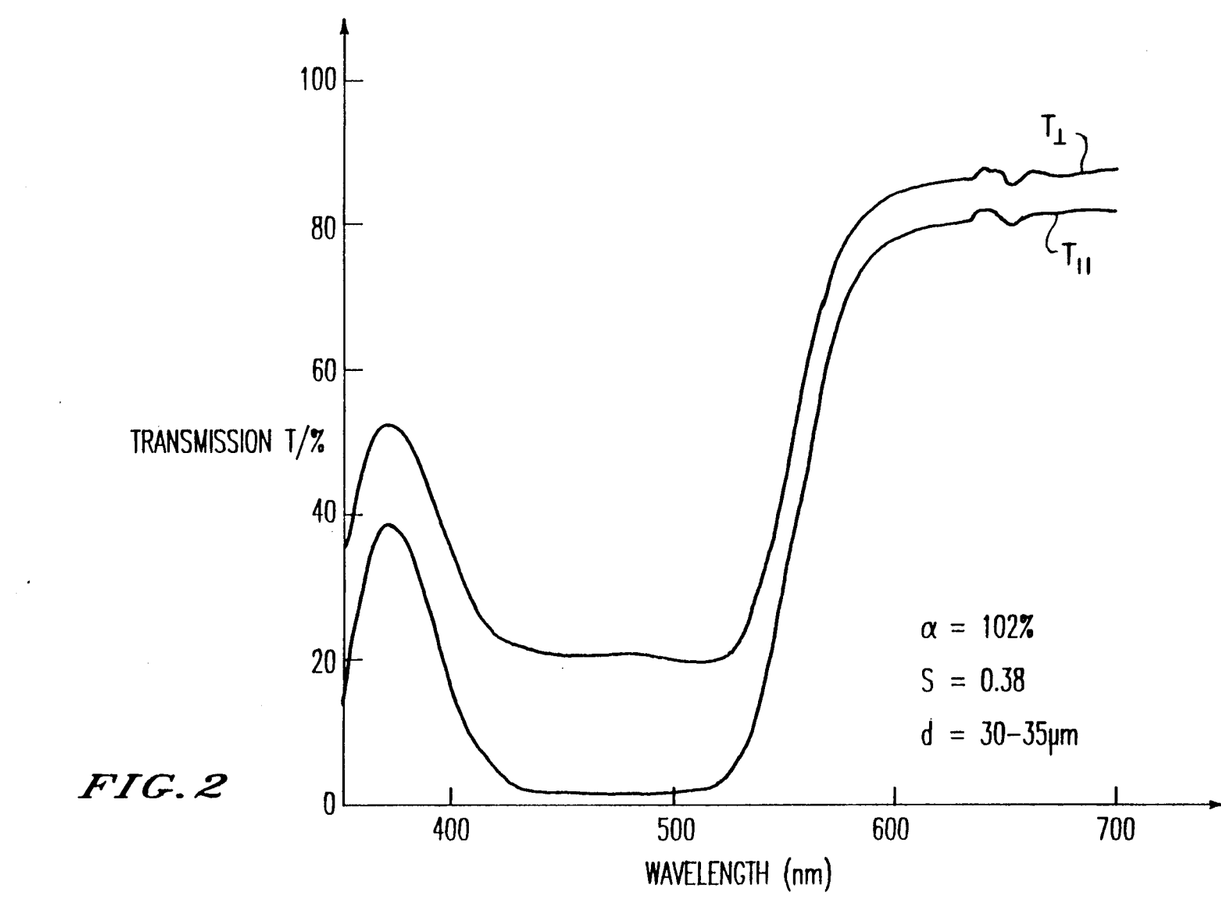

The free prepared films were tempered 24 hr at 50° C. and then were subjected to prescribed stretching at 80° C. The orientation parameters were characterized in the stretched state at room temperature, by UV-VIS (see FIGS. 1 and 2).

$$\alpha = \frac{(1 - l_o)}{l_o} \cdot 100[\%];$$

$$S = \frac{E_{II} - E_\perp}{E_{II} - 2E_\perp}$$

| α | s |
|---|---|
| 33% | 0.35 |
| 102% | 0.40 |

For comparison, an analogous sample was prepared without crosslinking agents, in a thin layer on a surface-structured support. The UV-VIS characterization was S=0.38.

EXAMPLE 2

A. Polymerization of the Prepolymer P'P'-2

2.5 g monomer 11-B, 25.2 ml monomer II-C, and 117.5 mg monomer I-A were polymerized in 2.5 ml dioxane and processed, using the methods described in Example I.

The result was a liquid crystalline prepolymer P'P'-2, having the formula:

where a=94, b=1, c=5, and a+b+c=100 mol %. Yield was 1.1 g, 42% of theoretical.

Characterization:
Mn=474,000 g/mol
Tg=30° C.
$T_{n,i}$=110° C.

B. Preparation of a Film, and Crosslinking to Form the Polymer PP-2

The procedure was analogous to that of Example I, but a 50% cyclopentanone solution was used. The crosslinked film was dried 1 day in vacuum at 90° C.

Tg=45° C.
$T_{n,i}$=102° C.

C. Stretching

The samples were conditioned 1 day at 50° C. and were stretched to an elongation of alpha=145% at 85° C. The resulting ordering parameter S was 0.55 at a film thickness of 15-20 micron.

EXAMPLE 3

A. Polymerization of the Polymer P'P'-3

2.6 g monomer II-A, 26 ml dye monomer II-A, and 148 mg stilbene monomer I-A were polymerized in 3 ml dioxane and processed, using the methods described in Example 1.

The result was a liquid crystalline prepolymer P'P'-3, having the formula:

where a=95, b=1, c=4, and a+b+c=100 mol %. Yield was 1.8 g, 67% of theoretical.

Characterization:
$M_n = 150,000$ g/mol
$T_g = 45°$ C.
$T_{n,i} = 120°$ C.

B. Preparation of a Film, and Crosslinking to Form the Polymer PP-3

The procedure was analogous to that of Example 1, but the film was prepared from a 50% methylene chloride solution.
$T_g = 48°$ C.
$T_{n,i} = 115°$ C.

C. Stretching

The stretching was carrier out analogously to Examples 1 and 2, following 1 day at 50° C. The stretching temperature was 95° C. The degree of stretching was alpha=120% and the film thickness was 25 micron. S=0.65.

Having now fully described the invention, it will be apparent to one of ordinary skill in the art that many changes and modifications can be made thereto without departing from the spirit or scope of the invention as set forth herein.

What is claimed as new and desired to be secured by Letters Patent of the United States is:

1. A self-supporting, anisotropic liquid crystalline polymer film produced by:
   forming a polymer film from a polymer material of a photocrosslinkable liquid crystalline poly(meth)acrylate ester dissolved in an organic solvent;
   photocrosslinking said polymer film to form a liquid crystalline poly(meth)acrylate ester at a temperature above Tg; and
   orienting said film, after crosslinking, by stretching at a temperature above Tg;
   wherein said photocrosslinkably liquid crystalline poly(meth)acrylate ester is formed from 0.1–10 wt %, based on the total weight of the monomer, of photocrosslinkable-group-containing monomers of formula I

$$CH_2=C(R)-X-(CH_2)_n-AR \qquad (I)$$

wherein R represents hydrogen or methyl; X represents a —COO— group or a —C(O)—N(R$_1$)— group wherein R$_1$ is hydrogen or an alkyl group of 1–4 carbon atoms; and Ar represents a —Q—CM=CH—Q' group or a group of the formula where Q is or r, p, m, s and q independently represent zero or 1, M is hydrogen or —C≡n, Q' is hydrogen, or a substituted phenyl, naphthyl or furanyl group, or a pyridinium ion, or is $$-C(O)_iR_2$$

where R$_2$ is a phenyl group, a hydroxyl group, or a C$_{1-6}$ alkoxy group, and i is zero or 1; and n is 2 to 14; and monomers of formula II $$CH_2=C(R)-X-Y-Z \qquad (II)$$

where R represents hydrogen or methyl; X represents a —COO— group or a —C(O)—N(R$_1$)— group were R$_1$ is hydrogen or an alkyl group with 1–4 carbon atoms; Y represents a spacer unit with 1–14 chain members; and Z represents a mesogenous group; wherewith the proportions by weight of monomers of formulas I and II add up to 100 wt % of the polymer.

2. The polymer film according to claim 1, which has a layer thickness between 1 and 100 micron.

3. An object having a liquid crystalline polymer film covering formed from the liquid crystalline polymer of claim 1.

4. The object of claim 3, wherein the polymer film layer has a preferred orientation and contains a colorant.

5. The object of claim 3, wherein the orientation of the polymer is modified by stretching of the polymer film.

6. The object of claim 3, which has a substrate which is formed from the liquid crystalline polymer of claim 1, and the polymer covering is a surface oriented layer.

* * * * *

UNITED STATES PATENT AND TRADEMARK OFFICE
CERTIFICATE OF CORRECTION

PATENT NO. : 5,098,975
DATED : March 24, 1992
INVENTOR(S) : Omeis et al

It is certified that error appears in the above-indentified patent and that said Letters Patent is hereby corrected as shown below:

Title page, Item [19]: delete "Omelis" and insert --Omeis--;

[75], delete "Jurgen Omelis" and insert --Juergen Omeis--;

[73], delete "Rohm" and insert --Roehm--;

Col. 4, line 49, the formula should read as --  --;

Signed and Sealed this

Fourteenth Day of December, 1993

Attest:

BRUCE LEHMAN

Attesting Officer     Commissioner of Patents and Trademarks